US008145518B2

(12) United States Patent
Cao et al.

(10) Patent No.: US 8,145,518 B2
(45) Date of Patent: Mar. 27, 2012

(54) SYSTEM AND METHOD FOR FINDING BUSINESS TRANSFORMATION OPPORTUNITIES BY ANALYZING SERIES OF HEAT MAPS BY DIMENSION

(75) Inventors: Rong Zeng Cao, Beijing (CN); Wei Ding, Beijing (CN); Shun Jiang, Beijing (CN); Juhnyoung Lee, Yorktown Heights, NY (US); Chun Hua Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 12/243,891

(22) Filed: Oct. 1, 2008

(65) Prior Publication Data

US 2010/0082386 A1    Apr. 1, 2010

(51) Int. Cl.
*G06Q 10/00* (2012.01)
(52) U.S. Cl. ............... 705/7.41; 705/7.11; 705/7.12; 705/7.36; 705/7.37; 705/7.38
(58) Field of Classification Search .......... 705/7.1–7.42, 705/36 R; 717/100–105
See application file for complete search history.

(56) References Cited

U.S. PATENT DOCUMENTS

| | | | | | |
|---|---|---|---|---|---|
| 5,737,494 | A | * | 4/1998 | Guinta et al. | 706/47 |
| 5,918,232 | A | * | 6/1999 | Pouschine et al. | 1/1 |
| 5,946,694 | A | * | 8/1999 | Copeland et al. | 1/1 |
| 6,011,559 | A | * | 1/2000 | Gangopadhyay et al. | 345/440 |
| 6,023,578 | A | * | 2/2000 | Birsan et al. | 717/105 |
| 6,119,149 | A | | 9/2000 | Notani | |
| 6,161,101 | A | * | 12/2000 | Guinta et al. | 706/45 |
| 6,212,530 | B1 | * | 4/2001 | Kadlec | 1/1 |
| 6,292,830 | B1 | * | 9/2001 | Taylor et al. | 709/224 |
| 6,332,130 | B1 | | 12/2001 | Notani et al. | |
| 6,339,838 | B1 | * | 1/2002 | Weinman, Jr. | 717/104 |
| 6,411,936 | B1 | | 6/2002 | Sanders | |
| 6,556,974 | B1 | * | 4/2003 | D'Alessandro | 705/7.32 |
| 6,601,233 | B1 | * | 7/2003 | Underwood | 717/102 |
| 6,789,252 | B1 | * | 9/2004 | Burke et al. | 717/100 |
| 6,919,910 | B2 | | 7/2005 | Chang | |
| 6,928,436 | B2 | | 8/2005 | Baudel | |
| 6,954,758 | B1 | * | 10/2005 | O'Flaherty | 707/802 |
| 6,965,868 | B1 | * | 11/2005 | Bednarek | 705/7.14 |
| 7,117,161 | B2 | | 10/2006 | Bruce | |
| 7,136,827 | B2 | | 11/2006 | Eicher | |
| 7,162,427 | B1 | | 1/2007 | Myrick et al. | |

(Continued)

OTHER PUBLICATIONS

M. Ernest; J.M. Nisavic; "Adding value to the IT organization with the Component Business Model" IBM Systems Journal, vol. 46, No. 3, 2007.*

(Continued)

*Primary Examiner* — Johnna Loftis
*Assistant Examiner* — Alan S Miller
(74) *Attorney, Agent, or Firm* — Scully, Scott, Murphy & Presser, P.C.; William Stock, Esq.

(57) ABSTRACT

A method and system for analyzing business performance and opportunities by generating one or more series of heat map views of business components by a plurality of dimensions associate information related to a plurality of dimensions with one or more business components; define one or more dimensions from the plurality of dimensions; generate one or more series of heat map views of the said business components by said defined one of more dimensions; and present said series of heat map views of the business components.

35 Claims, 13 Drawing Sheets

U.S. PATENT DOCUMENTS

| | | | |
|---|---|---|---|
| 7,206,751 B2 | 4/2007 | Hack et al. | |
| 7,246,128 B2* | 7/2007 | Jordahl | 1/1 |
| 7,251,613 B2 | 7/2007 | Flores et al. | |
| 7,283,986 B2 | 10/2007 | Okunseinde et al. | |
| 7,308,414 B2* | 12/2007 | Parker et al. | 705/7.27 |
| 7,415,437 B2 | 8/2008 | Marvin et al. | |
| 7,503,032 B2* | 3/2009 | Bhaskaran et al. | 717/104 |
| 7,506,302 B2* | 3/2009 | Bahrami | 717/100 |
| 7,574,694 B2* | 8/2009 | Mangan et al. | 717/123 |
| 7,584,117 B2* | 9/2009 | Bubner | 705/7.36 |
| 7,593,012 B2 | 9/2009 | Ikehata et al. | |
| 7,605,813 B2 | 10/2009 | Uthe | |
| 7,617,177 B2* | 11/2009 | Bukary et al. | 1/1 |
| 7,668,855 B2 | 2/2010 | Hodgson et al. | |
| 7,693,738 B2* | 4/2010 | Guinta et al. | 705/7.32 |
| 7,885,841 B2 | 2/2011 | King | |
| 7,925,594 B2 | 4/2011 | Jaligama et al. | |
| 7,933,762 B2* | 4/2011 | Pinto et al. | 703/22 |
| 2001/0034628 A1* | 10/2001 | Eder | 705/7 |
| 2001/0049615 A1* | 12/2001 | Wong et al. | 705/8 |
| 2002/0099563 A1* | 7/2002 | Adendorff et al. | 705/1 |
| 2003/0004746 A1* | 1/2003 | Kheirolomoom et al. | 705/1 |
| 2004/0059611 A1 | 3/2004 | Kananghinis et al. | |
| 2004/0064436 A1* | 4/2004 | Breslin et al. | 707/1 |
| 2004/0078378 A1* | 4/2004 | Bala | 707/100 |
| 2004/0078777 A1* | 4/2004 | Bahrami | 717/105 |
| 2004/0143470 A1 | 7/2004 | Myrick et al. | |
| 2005/0065831 A1 | 3/2005 | Keay et al. | |
| 2005/0119922 A1* | 6/2005 | Eder | 705/7 |
| 2005/0154769 A1 | 7/2005 | Eckart et al. | |
| 2005/0171980 A1 | 8/2005 | Fernandez et al. | |
| 2005/0203784 A1* | 9/2005 | Rackham | 705/7 |
| 2005/0246215 A1* | 11/2005 | Rackham | 705/7 |
| 2006/0015424 A1 | 1/2006 | Esposito et al. | |
| 2006/0100947 A1 | 5/2006 | Cimral et al. | |
| 2006/0129419 A1 | 6/2006 | Flaxer et al. | |
| 2006/0178920 A1* | 8/2006 | Muell | 705/8 |
| 2006/0184412 A1 | 8/2006 | Kagan et al. | |
| 2006/0190544 A1 | 8/2006 | Chikirivao et al. | |
| 2006/0195373 A1 | 8/2006 | Flaxer et al. | |
| 2006/0229926 A1* | 10/2006 | Homann et al. | 705/9 |
| 2006/0241956 A1* | 10/2006 | Levy et al. | 705/1 |
| 2007/0021993 A1 | 1/2007 | Chandra et al. | |
| 2007/0022410 A1* | 1/2007 | Ban et al. | 717/136 |
| 2007/0027701 A1* | 2/2007 | Cohn et al. | 705/1 |
| 2007/0033211 A1* | 2/2007 | Berman et al. | 707/102 |
| 2007/0038465 A1* | 2/2007 | Jang et al. | 705/1 |
| 2007/0038501 A1* | 2/2007 | Lee et al. | 705/10 |
| 2007/0038502 A1 | 2/2007 | Kagan et al. | |
| 2007/0038627 A1* | 2/2007 | Cohn et al. | 707/8 |
| 2007/0050232 A1* | 3/2007 | Chang et al. | 705/10 |
| 2007/0106520 A1* | 5/2007 | Akkiraju et al. | 705/1 |
| 2007/0118551 A1* | 5/2007 | Akkiraju et al. | 707/102 |
| 2007/0136115 A1* | 6/2007 | Senturk Doganaksoy et al. | 705/7 |
| 2007/0162482 A1* | 7/2007 | Flaxer et al. | 707/101 |
| 2007/0174109 A1 | 7/2007 | Cohn et al. | |
| 2007/0179822 A1 | 8/2007 | Benayon et al. | |
| 2007/0179825 A1 | 8/2007 | Dreiling et al. | |
| 2007/0203766 A1 | 8/2007 | Adler et al. | |
| 2007/0214025 A1 | 9/2007 | Jang et al. | |
| 2007/0245297 A1* | 10/2007 | Kuester et al. | 717/104 |
| 2007/0250373 A1* | 10/2007 | Ernest et al. | 705/10 |
| 2007/0265864 A1 | 11/2007 | Chess et al. | |
| 2007/0271277 A1* | 11/2007 | Ivan et al. | 707/100 |
| 2007/0279416 A1* | 12/2007 | Cobb et al. | 345/440 |
| 2008/0004924 A1 | 1/2008 | Cao et al. | |
| 2008/0033888 A1* | 2/2008 | Flaxer et al. | 705/36 R |
| 2008/0172273 A1 | 7/2008 | Rackham | |
| 2008/0177622 A1 | 7/2008 | Akkiraju et al. | |
| 2008/0313596 A1 | 12/2008 | Kreamer et al. | |
| 2009/0006150 A1 | 1/2009 | Prigge et al. | |

OTHER PUBLICATIONS

Juhnyoung Lee and Anca-Andreea Ivan "Value-Centric, Model-Driven Business Transformation" CEC-EEE '06 Proceedings of The 8th IEEE International Conference on E-Commerce Technology and The 3rd International Conference on Enterprise Computing, E-Commerce and E-Services, IEEE Computer Society, Washington, DC ISBN 0-7695-2511-3.* fThomas Li, Wei Ding, Chunhua Tian, Rongzeng Cao, Shunxiang Yang, and Jun Zhu "Continual Business Transformation Technology" International Federation for Information Processing, vol. 205, Research and Practical Issues of Enterprise Information Systems, eds. Tjoa, A.M., Xu, L., Chaudhry, S., (Boston:Springer), pp. 85-95.*

Pentapalli, A Comparative Study of Roth-Erev and Modified Roth-Erev Reinforcement Learning Algorithms for Uniform-Price Double Actions, Iowa State University, 2008.

Brown et al., Treemap 97, 1997, Retrieved from http://otal.umd.edu/Olive/Class/Trees.

Cable et al., Project Portfolio Earned Value Management Using Treemaps, Project Management Institute Research Conference, Jul. 2004.

Johnson et al., Tree-Maps a Space-Filling Approach to the Visualization of Hierarchical Information Structures, IEEE CH3046-09100000284, 1991.

Jungmeister et al., Adapting Treemaps to Stock Portfolio Visualization, University of Maryland, Institute for System Research, Nov. 1992.

North et al., Snap-Together Visualization—Coordinating Multiple Views to Explore Information, HCIL Technical Report 99-10, May 1999.

Shneiderman, Discovering Business Intelligence Using Treemap Visualizations, Beyey Network, Apr. 2006.

Shneiderman, Tree Visualization with Tree-Maps—A 2-D Space-Filling Approach, University of Maryland, 1991.

Songer, Multidimensional Visualization of Project Control Data, Construction Innovation, 4, 173-190, 2004.

Office Action dated Oct. 11, 2011 received in related U.S. Appl. No. 12/243,872.

Office Action dated Jun. 23, 2011 received in related U.S. Appl. No. 12/243,898.

Office Action dated Jul. 5, 2011 received in related U.S. Appl. No. 12/243,811.

Microsoft Office Project Server 2007, 2006 Microsoft Corporation, http://download.microsoft.com/download/e/b/9/eb9e67aa-ae8c-4cc4-aad8-9e352f92c28c/ProjectPortfolioServer2007ProductGuide.doc.

Microsoft Office Project Portfolio Server 2007 Optimizer, https://www.am.ohio.gov/PortfolioServer/Manuals/MOPPS-Optimizer.pdf.

Balzer et al., Voronoi Treemaps for the Visualization of Software Metrics, Association for Computing Machinery Inc., 2005.

Bederson et al., Ordered and Quantum Treemaps Making Effective use of 2D Space to Display Hierarchies, Institute of Advanced Computer Studies, College Park, MD, ACM, 2002.

Bladh, Step Tree, A File System Visualizer, Thesis No. MSC-2002-3, Department of Software Engineering and Computer Science, Blekinge Institute of Technology, Sweden, 2002.

Hodgson, Squarified Treemaps in XAML and C sing Microsoft Longhorne, the Code Project, 2002.

Heat Map, http://en.wikipedia.org/wiki/Heat_map.

Office Action dated May 20, 2011 received in related U.S. Appl. No. 12/243,872.

Office Action dated Jul. 19, 2011 received in related U.S. Appl. No. 12/243,851.

U.S. Office Action mailed Dec. 16, 2011 received in related U.S. Appl. No. 12/243,898.

U.S. Office Action mailed Dec. 22, 2011 received in related U.S. Appl. No. 12/243,811.

* cited by examiner

AFT Workbench Model Template.xls

| | A | B | C | D | E | F | G | H | I | J | K | L | M | N |
|---|---|---|---|---|---|---|---|---|---|---|---|---|---|---|
| 1 | Level 2 | Level 1 | Level 2 | Level 3 | Level 4 | Level 5 | Level 6 | Level 7 | Value_Type | Value_Unit | Median_Value | Benchmark | As_Is_Value | To_Be_Val |
| 2 | | Profit | | | | | | | | | | | | |
| 3 | | Revenue | | | | | | | | | | | | |
| 4 | | Costs | | | | | | | | | | | | |
| 5 | | | Cost of goods sold | | | | | | | | | | | |
| 6 | | | Sales, general & administration costs (SG&A) | | | | | | | | | | | |
| 7 | | | | Financial management accounting costs | | | | | | | | | | |
| 8 | | | | | Planning & management accounting cost | | | | | | | | | |
| 9 | | | | | | Planning cost | | | | | | | | |
| 10 | | | | | | | Total cost of process "perform planning/budgeting/fc | | Less is Better | Currency ($)/t | 0.53 | 0.21 | 0.53 | 0.21 |
| 11 | | | | | | | Total cost of process "perform planning/budgeting/ | | Less is Better | Currency ($)/t | 1.26 | 0.49 | 1.26 | 0.49 |
| 12 | | | | | | | Total cost of process "perform planning/budgeting/ | | Less is Better | Currency ($)/t | 1204.03 | 309.33 | 1204.03 | 309.33 |
| 13 | | | | | | | Total cost of process "perform planning/budgeting/ | | Less is Better | Currency ($)/t | 693.33 | 42.95 | 693.33 | 42.95 |
| 14 | | | | | | Cost accounting & management cost | | | | | | | | |
| 15 | | | | | | | Total cost of the processes "perform cost accounting and | | Less is Better | Currency ($)/t | 0.77 | 0.29 | 0.77 | 0.29 |
| 16 | | | | | | | Total cost of the processes "perform cost accounting and | | Less is Better | Currency ($)/t | 1.41 | 0.54 | 1.41 | 0.54 |
| 17 | | | | | | | Total cost of the processes "perform cost accounting and | | Less is Better | Currency ($)/t | 964.00 | 221.40 | 964.00 | 221.40 |
| 18 | | | | | | Financial performance evaluation cost | | | | | | | | |
| 19 | | | | | | | Total cost of process "evaluate and manage financial | | Less is Better | Currency ($)/t | 0.49 | 0.18 | 0.49 | 0.18 |
| 20 | | | | | | | Total cost of process "evaluate and manage financial | | Less is Better | Currency ($)/t | 1.03 | 0.29 | 1.03 | 0.29 |
| 21 | | | | | | | Total cost of process "evaluate and manage financial | | Less is Better | Currency ($)/t | 555.64 | 17.43 | 555.64 | 17.43 |
| 22 | | | | | Revenue accounting cost | | | | | | | | | |
| 23 | | | | | | Credit management cost | | | | | | | | |
| 24 | | | | | | | Total cost of process "process customer credit" per o | | Less is Better | Currency ($)/t | 0.27 | 0.07 | 0.27 | 0.07 |
| 25 | | | | | | | Total cost of process "process customer credit" per o | | Less is Better | Currency ($)/t | 0.34 | 0.09 | 0.34 | 0.09 |
| 26 | | | | | | Invoice customer cost | | | | | | | | |
| 27 | | | | | | | Total cost of the process "invoice customer" per one tho | | Less is Better | Currency ($)/t | 0.48 | 0.11 | 0.48 | 0.11 |
| 28 | | | | | | | Total cost of the process "invoice customer" per one tho | | Less is Better | Currency ($)/t | 0.61 | 0.17 | 0.61 | 0.17 |
| 29 | | | | | | | Total cost of the process "invoice customer" per invoice p | | Less is Better | Currency ($)/t | 1.91 | 0.36 | 1.91 | 0.36 |
| 30 | | | | | | | Total cost of the process "invoice customer" per invoice l | | Less is Better | Currency ($)/t | 0.49 | 0.09 | 0.49 | 0.09 |
| 31 | | | | | | AR cost | | | | | | | | |
| 32 | | | | | | | Total cost of the process "process accounts receivable" p | | Less is Better | Currency ($)/t | 0.37 | 0.11 | 0.37 | 0.11 |
| 33 | | | | | | | Total cost of the process "process accounts receivable" p | | Less is Better | Currency ($)/t | 0.56 | 0.15 | 0.56 | 0.15 |
| 34 | | | | | | | Total cost of the process "process accounts receivable" p | | Less is Better | Currency ($)/t | 3.58 | 0.82 | 3.58 | 0.82 |
| 45 | | | | | | | Total cost of the process "process accounts receivable" p | | Less is Better | Currency ($)/t | 1.15 | 0.37 | 1.15 | 0.37 |
| 36 | | | | | | | Total cost of the process "process accounts receivable" p | | Less is Better | Currency ($)/t | 0.41 | 0.07 | 0.41 | 0.07 |
| 37 | | | | | | Collection cost | | | | | | | | |
| 38 | | | | | | | Total cost of the process "manage and process collection | | Less is Better | Currency ($)/t | 0.31 | 0.10 | 0.31 | 0.10 |
| 39 | | | | | | | Total cost of the process "manage and process collection | | Less is Better | Currency ($)/t | 0.25 | 0.05 | 0.25 | 0.05 |
| 40 | | | | | | | Total cost of the process "process collections" per invoices | | Less is Better | Currency ($)/t | 1.71 | 0.45 | 1.71 | 0.45 |

| Financial Operations | Accounting Close and Consolidation | External Financial Reporting | Business Performance Management | Planning, Budgeting, Forecasting | Risk and Compliance Management | Treasury & Investments | Tax Management | Speciality Services | Financial Administration |
|---|---|---|---|---|---|---|---|---|---|
| Financial Procedures & Business Rules (Red) | Close Coordination and Scheduling | Investor Relations Management | Management Reporting Framework | Budget Procedures and Rules (Yellow) | Internal Controls Framework (Yellow) | Liquidity Planning | Tax Strategies and Planning | External Financial Audit Requirements | Financial Policies & Procedures (Red) |
| | | | | Strategic Planning and Target Setting | | Treasury Procedures and Rules | | Internal Audit Objectives & Planning (Yellow) | Financial Systems Architecture Planning (Red) |
| | Accounting Policies and Procedures | Financial Disclosure Requirements | Management Reporting Procedures & Rules | Operational Planning (Yellow) | Financial Procedures & Business Rules (Yellow) | Investment Portfolio Planning | Tax Compliance Policies and Procedures | M&A Strategy | Staff Planning (Red) |
| | | | KPI Definition (Red) | Capital Planning (Yellow) | | Investment Procedures and Rules | | Financial Business Strategy & Corporate Structure | Data Governance Strategy & Rules |
| | | | | | | | | | Finance Service Delivery Model |

Direct

| | Admin | R&D | SCM | Sale |
|---|---|---|---|---|
| Plan | | | | |
| Control | | | | |
| Executor | | | | |

1004

| | Admin | R&D | SCM | Sale |
|---|---|---|---|---|
| Plan | | | | |
| Control | | | | |
| Executor | | | | |

AP

SYSTEM AND METHOD FOR FINDING BUSINESS TRANSFORMATION OPPORTUNITIES BY ANALYZING SERIES OF HEAT MAPS BY DIMENSION

CROSS-REFERENCE TO RELATED APPLICATIONS

This application is related to U.S. patent application Ser. No. 12/243,811 entitled, "SYSTEM AND METHOD FOR FINANCIAL TRANSFORMATION," U.S. patent application Ser. No. 12/243,851 entitled, "SYSTEM AND METHOD FOR INFERRING AND VISUALIZING CORRELATIONS OF DIFFERENT BUSINESS ASPECTS FOR BUSINESS TRANSFORMATION," U.S. patent application Ser. No. 12/243,872 entitled, "SYSTEM AND METHOD FOR DETERMINING TEMPERATURE OF BUSINESS COMPONENTS FOR FINDING BUSINESS TRANSFORMATION OPPORTUNITIES," U.S. patent application Ser. No. 12/243,898 entitled, "SYSTEM AND METHOD FOR FINDING BUSINESS TRANSFORMATION OPPORTUNITIES BY USING A MULTI-DIMENSIONAL SHORTFALL ANALYSIS OF AN ENTERPRISE," filed on even date and assigned to the same assignee in the present application, contents of which are incorporated by reference herein in their entirety. This application is also related to U.S. patent application Ser. No. 12/164,582 entitled, "SYSTEM AND METHOD FOR PLATFORM-INDEPENDENT, SCRIPT-BASED APPLICATION GENERATION FOR SPREADSHEET SOFTWARE," filed on Jun. 30, 2008 and assigned to the same assignee of the present application, contents of which are incorporated by reference herein in its entirety.

FIELD OF THE INVENTION

The present disclosure relates generally to computer applications, and more particularly to finding business transformation opportunities by analyzing series of heat maps by dimension.

BACKGROUND OF THE INVENTION

Business transformation is a key management initiative that attempts to align people, process and technology of an enterprise closely with its business strategy and vision. Business transformation is often achieved by taking a holistic look at various dimensions of an enterprise such as business models, management practices, business processes, organizational structure and technology and optimizing them with best-practice or differentiated methods to reach a strategic end state. For example, business transformation in the enterprise finance area would, among others, optimize financial processes such as accounts receivables, eliminate non-value-added tasks, improve efficiency and productivity of people, and reduce errors by using technologies. Business transformation is considered an essential part of the competitive business cycle.

Consulting service companies in the business transformation area brand technology and consulting as their core product and service offerings. These offerings include models, methods and tools devised for facilitating business transformation. While the state-of-the-art business transformation consulting models and methods are useful, there are a number of general problems that need to be addressed to make them more effective. First, the current approaches are often limited in scalability because they demand subject matter experts to work with a variety of disconnected data, tools, templates and other assets. It is often cumbersome and difficult to streamline the data gathering and management manually. Data and documents often reside in multiple folders distributed among several machines. Consistency checking across data can only be done manually, and the process requires experts. It is not easy to capture a structured thinking process without a tool, which enforces the process or method. Information and knowledge not captured systematically is often difficult to disseminate and reuse effectively. Assets such as knowledge, models and methods are not necessarily managed. For example, more often than not, there is no version control put in place, and updating the assets consistently across the board becomes a daunting task. Multiple views with scattered documents having multiple views such as a process view, metrics view, component view, resource view, etc. are difficult to visualize. This in turn makes it difficult to link up upstream and downstream analysis.

Business transformation is related to earlier efforts and studies in Business Process Reengineering, Business Process Redesign, Business Process Change Management, Business Process Management, and Enterprise Architecture. Business process reengineering (BPR) is a management approach aiming at improvements by means of elevating efficiency and effectiveness of the processes that exist within and across organizations. In BPR, organizations look at their business processes from an unbiased perspective and determine how they can best construct these processes to improve how they conduct business. In 1990s, process reengineering was adopted at an accelerating pace. The early BPR methodologies were rooted in IT-centric BPR solutions. One such model, Process Reengineering Life Cycle approach outlines an iterative application of the following steps: (1) envision new processes, (2) initiating change, (3) process diagnosis, (4) process redesign, (5) reconstruction, and (6) process monitoring. While useful in specific cases, the methodologies did not address issue of scalable applications from the practitioner's viewpoint. There are few tools or information technology that comprehensively facilitates the BPR methodology, and users are left with primitive means for practicing the methodology.

Business Process Management (BPM) is an emerging field of knowledge and research at the intersection between management and information technology, encompassing methods, techniques and tools to design, enact, control, and analyze operational business processes involving humans, organizations, applications, documents and other sources of information. BPM differs from BPR in that it does not aim at one-off revolutionary changes to business processes, but at their continuous evolution. In addition, BPM usually combines management methods with information technology to make business transformation activities faster and cheaper. BPM systems monitor the execution of the business processes so that managers can analyze and change processes in response to data, rather than just a hunch. BPM allows the organizations to manage their processes as any other assets and improve and manage them over the period of time. The activities which constitute BPM life-cycle can be grouped into five categories: Process Design, Process Modeling, Process Execution, Process Monitoring, and Process Optimization.

Another related concept is Enterprise Architecture, which is the description of the current and future structure and behavior of an organization's processes, information systems, personnel and organizational sub-units, aligned with the organization's core goals and strategic direction. Although often associated strictly with information technology, it relates more broadly to the practice of business optimization in that it addresses business architecture, performance management, organizational structure and process architecture as well. The primary purpose of creating enterprise architecture is to ensure that business strategy and IT investments are aligned. As such, enterprise architecture allows traceability from the business strategy down to the underlying technology. The practice of enterprise architecture involves developing an architecture framework to describe a series of "current", "intermediate" and "target" reference architectures and applying them to align change within the enterprise. These frameworks detail all relevant structure within the organization including business, applications, technology and data. Each framework will provide a rigorous taxonomy and ontology that clearly identifies what processes a business performs and detailed information about how those processes are executed. While enterprise architecture is a key component of the information technology governance process at any organization of significant size, it also ideally relates broadly to the practice of business process management and optimization, because it addresses business architecture, performance management and process architecture as well.

U.S. Patent Publication 2005/0246215A1 discloses a system and method for alignment of an enterprise to component business model (CBM). This patent publication discloses creating a component business model of the enterprise in its current state and a component business model of a desired state, then comparing the two to identify the areas of improvement and change. The differences identified between the two are prioritized for alignment with business objectives.

U.S. Patent Publication 2007/0027701 discloses a system and method for using component business model to organize an enterprise. This patent publication discloses how a component business model can be used to organize an enterprise. It describes identifying non-overlapping components of a business and then distinguishing them based on whether each component helps differentiate the business in the marketplace or if it provided standardized functions. One can analyze the attributes of each component and mark components as 'hot', meaning they might need to be optimized to align to the business objectives.

U.S. Patent Publication 2007/0174109 discloses a system and method for transforming an enterprise using a component business model. This patent publication describes a system and a method of using a CBM map for transforming an enterprise. Specifically, it discloses that industry standard CBM maps can be prepared ahead of time for each industry and that these can be retrieved from a repository and customized for each client's need. Components in a CBM can be rearranged based on the transformation strategy chosen. Special views can be enabled on a CBM map to query and focus on specific components related to a specific capability.

U.S. Patent Publication 2008/0033888 discloses a method and system for enterprise portfolio management based on component business model. This patent publication describes managing a portfolio of enterprise IT applications based on component business model. The idea is to help select a suitable set of IT transformation projects from among a larger set of IT transformation projects by conducting value analysis. This value analysis keeps the existing IT infrastructure of the client into account.

The above described patent publications, however, do not disclose or suggest identification of business transformation initiatives automatically, conducting a business case analysis of the transformation initiatives identified via component business modeling analysis, for instance, including return on investment (ROI) calculation, net present value (NPV) calculation, break-even analysis, internal rate of return (IRR), etc. Those publications also do not disclose or suggest, pre-populating the tool with various industry specific content (such as metrics, costs of transformations etc) based on past history, or providing what-if scenario analysis for evaluating several transformation initiatives, thereby facilitating the selection of best suited set of transformations from a portfolio of transformation choices possible. They also do not disclose or suggest automation of health measurement of each component by comparing the metrics associated with a component with those of industry benchmarks. In addition, while known CBM and benchmarking methodologies may provide heat map analysis, they are limited to a single, snapshot view of heat map and do not support series of heat maps.

BRIEF SUMMARY OF THE INVENTION

A system and method for analyzing business performance and opportunities by generating one or more series of heat map views of business components by a plurality of dimensions are provided. The method, in one aspect, may comprise associating information related to a plurality of dimensions with one or more business components and defining one or more dimensions from the plurality of dimensions. The method may further comprise generating one or more series of heat map views of the said business components by said defined one or more dimensions and presenting said series of heat map views of the business components.

A system for analyzing business performance and opportunities by generating one or more series of heat map views of business components by a plurality of dimensions, in one aspect, may comprise a configuration module operable to define a plurality of dimensions of one or more business components. A dimension organizer module is operable to transform a business component map comprising said one or more business components into a view with said plurality of dimensions to generate one or more series of heat map views of the said business components by said plurality of dimensions. A multiple-dimension heat map presenter module is operable to present said one or more series of heat map views in different dimensional perspective.

A program storage device readable by a machine, tangibly embodying a program of instructions executable by the machine to perform above-described methods may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 is an example of a model template provided in the present disclosure in one embodiment.

FIG. 6 illustrates a component business model rendered in BT tool of the present disclosure in one embodiment.

FIG. 8 shows an example of a CBM map showing the result of a Business Component Performance Analysis.

FIGS. 10A, 10B, and 10C illustrate two examples of evaluation analysis and determining one or more variances and/or differences.

DETAILED DESCRIPTION

A system and method of the present disclosure in one embodiment enable heap map analysis of business or business components and support series of heat maps. In one aspect, the system and method of the present disclosure in one embodiment support and analyze series of heat map views by different dimensions. Different dimensions may include but are not limited to time, geographical location such as country, business unit, industry and/or company, as-is and to-be, directional change for the better or worse, CBM maps of supply chain or eco-system. Time dimension analysis may show for example, a heat map per quarter for four years of the CEO's tenure to understand his or her performance, and/or to understand the project impact by comparing as-is and to-be heat maps. Geographical or country dimension may show a heat map per geographical location or country to understand each region's performance. Business unit dimension may show a heat map per unit to understand each unit's performance. Industry and/or company dimension may find a similar heat map from other industry and/or company in an effort to apply best practice solution. As-Is vs. To-Be dimension may show understanding of the desired heat map according to enterprise strategy and current status. Direction change dimension may show whether the business is becoming better, worse, or staying the same. CBM maps of supply chain or eco-system dimension may show connected CBM maps of suppliers, manufacturers, distributors, competitors, etc. The series of heat map analysis and view of the present disclosure may include showing and/or analyzing multiple dimensions together, for instance, by geographical location and then by time; by business unit and by time; by time and by resource (e.g., budget, cost etc.); by time and by performance, etc.

Figure 2:
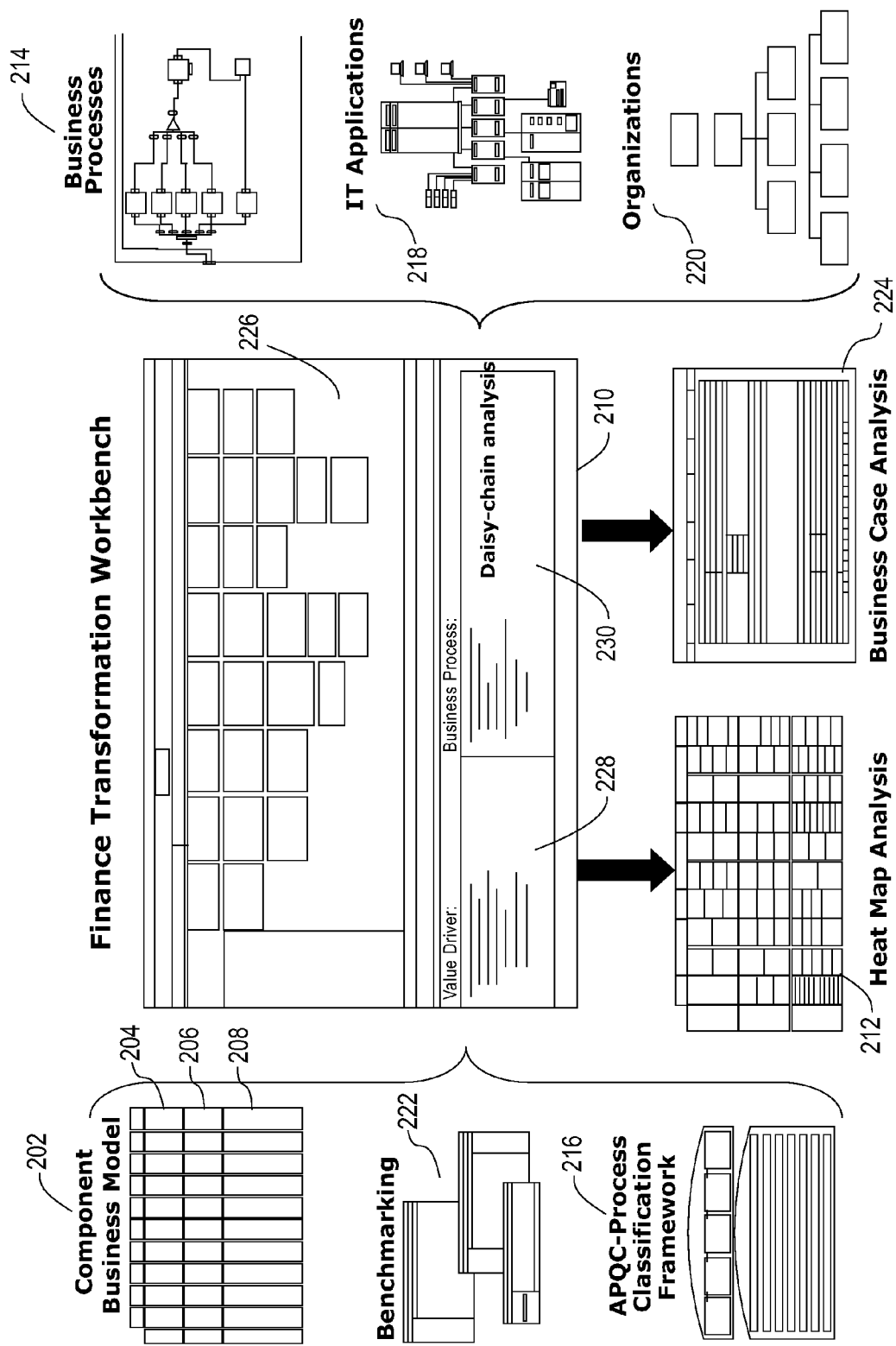
FIG. 2 is an overview of a business transformation (BT) tool environment in one embodiment of the present disclosure.
Figure 6:
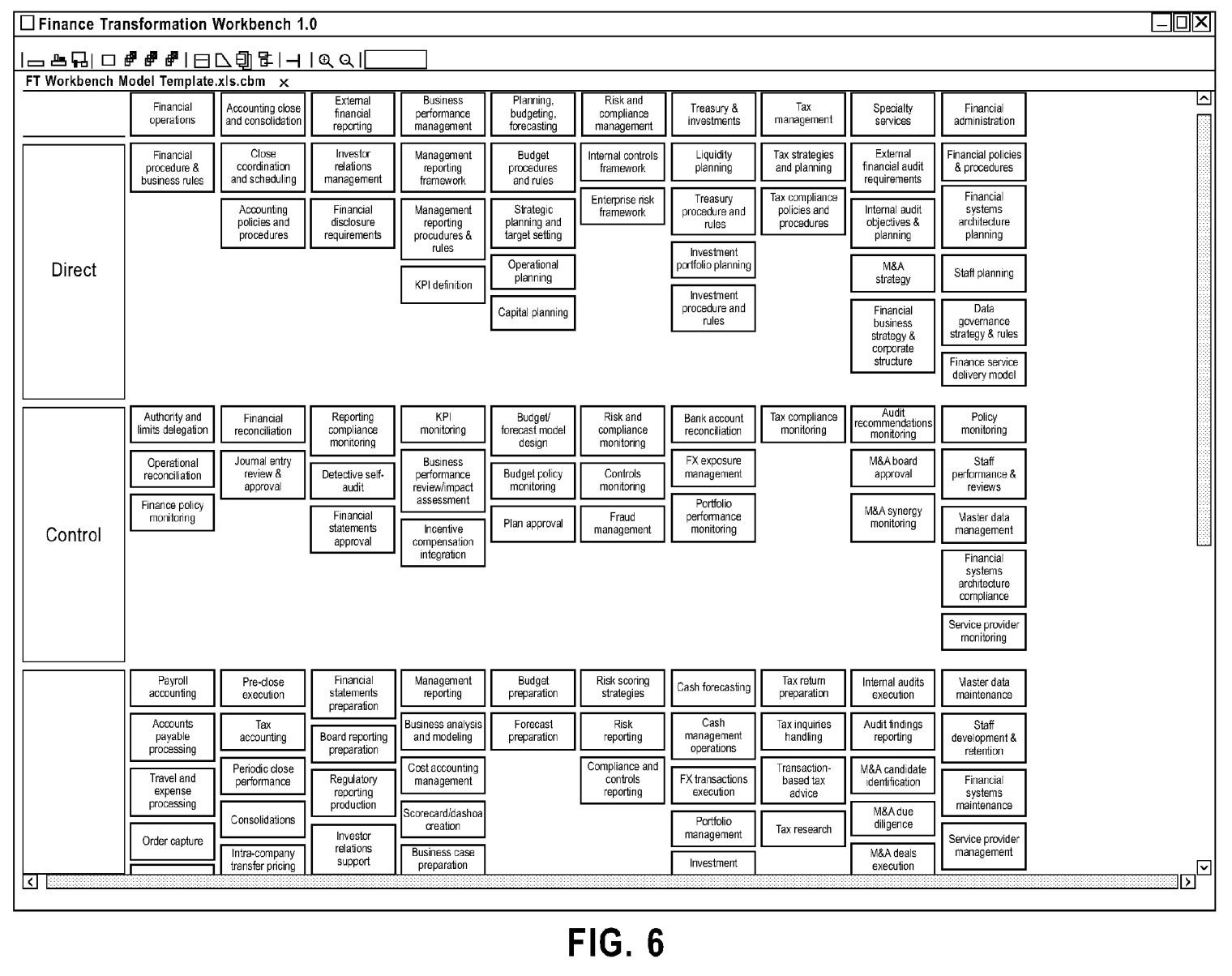

FIG. 2 is an overview of a business transformation (BT) tool environment in one embodiment of the present disclosure, for instance, in which the heat map analysis of the present disclosure may be utilized and/or implemented. In this disclosure, Financial Transformation (FT) is also referred to as Business Transformation (BT). BT tool of the present disclosure provides an integrated view of various business models and data, for example, including component business models 202, a business process model such as APQC (American Product Quality Council) Process Classification Framework (PCF) 216 and SAP Business Process Hierarchy (BPH), a value driver model, an IT infrastructure map 218, an organization structure map 220, and a solution catalog, with the models linked each other. Another example of component business model (202) is shown in fuller view in FIG. 6. BT tool environment in one embodiment of the present disclosure automates traditional component business model-based analyses in the form of visual queries and inference in one embodiment. For example, one can ask questions such as which metrics help measure the performance of a given business component? What are the IT systems that support the business functions represented by a business component? Which organizations implement the business functions represented by a business component? Which transformation solutions can address a given shortfall? These questions are answered in the tool via the explicit and the inferred linkages made among different models such as the component model 202, IT system model 218, organizational model 220, metrics model 222, business processes model 214, etc. This is also referred to as daisy chain analysis in the tool.

The BT tool of the present disclosure automates the component performance analysis by comparing the metrics that help measure the performance of a component with benchmark data 222. This is referred to as "heat map" analysis in the tool. An example view of a heat map is shown at 212. The underperforming components can be marked as shortfalls based on whether it is caused by a misaligned IT system or by an organization. This identification and marking of shortfalls is referred to as "shortfall assessment" in the tool. The tool provides business benefit analyses in terms of value drivers and standard financial metrics for business case analysis 224 such as NPV (Net Present value), IRR (Internal Return Rate), ROI (Return on Investment), and payback time. The BT tool provides normative and constructive business performance analysis models, so it can be easily configured for different types of clients, initiatives, and projects.

In one embodiment, BT tool may provide views of enterprise CBM maps 226, value drivers 228, and business activities 230 and provides navigation through all of them. It enables analysts to navigate the views and identify dependencies and causal relationships among value drivers 228 and business activities 230 and components 226. It also enables analysts to pinpoint business activities and value drivers supported and improved by solutions and services. It provides detailed value driver reports with charting generated by advanced value modeling. Also, it provides detailed financial analysis reports with charting generated by advanced value modeling.

BT tool of the present disclosure may comprise a Model Template, which may be an Excel™ file providing a template for data preparation and storage for analyses; Transformation Analyzer, which may be a Windows™ application where the user can explore various model views, conduct CBM-based analyses, and identify transformation initiatives for proposal; and Business Case Calculator, which may be an Excel™-based tool where the user can perform business case analysis for the initiatives identified in the Transformation Analysis. These three components may be seamlessly connected to each, and so the user can move back and forth among the components in a straightforward manner. Details of various functionalities of the BT tool are described below.

Model Template

To run business transformation analyses in the system, a set of models and content are prepared following a set of rules. The content preparation can be done by using the provided Model Template, which may be an MS Excel™ file or another spreadsheet application or like, with formatting for the content. The content preparation may include preparing the base models, for example, the six base models. The six base models, for instance, include models for Business Component, Business Process, Value Drivers, Applications, Organizations, and Solutions. The content preparation also includes linking or mapping these base models. Model mapping is described in further detail below.

In one embodiment of the BT tool, content for the base models (e.g., the six base models) are provided in six separate worksheets in the Model Template: one model in each worksheet—Business Component, Business Process, Value Drivers, Applications, Organizations, and Solutions. The BT tool may include a set of sample content for each of the base models (e.g., the model templates populated with initial or default data), for example, derived from available benchmark data, such as APQC, IBM Benchmarking data, and solution and service offering catalogs. Data entries such as metric may have a set of attributes, which may be used in various analyses.

In one embodiment the Business Component worksheet provides a tabular representation of a CBM map. Business components are grouped by their competencies and each component has its accountability level, i.e., direct, control or execute, as an attribute.

The Business Process worksheet in one embodiment provides a hierarchical representation of a business process structure, e.g., APQC PCF (Process Classification Framework), SAP BPH (Business Process Hierarchy), or IBM EPF (Enterprise Process Framework).

The Value Driver worksheet in one embodiment provides a hierarchical representation of Key Performance Indicators (KPI) of business processes. At the lowest level, it provides business metrics, which are used to measure the performance of low level business activities of the Business Process Hierarchy. The Value Driver worksheet may be pre-populated with one or more attribute values such as one or more benchmark values and the business' current value. The low level metrics are grouped into one or more higher level indicators. At the highest level of the Value Driver tree, the indicators are grouped into financial metrics of enterprises such as cost, revenue, profit, share value, etc.

The Applications worksheet in one embodiment provides a hierarchical representation of the IT infrastructure and applications the enterprise or entity is currently deploying. This information is used in one embodiment of the method and system of the present disclosure to understand where the enterprise stands, and identify any shortfalls in terms of IT.

The Organizations worksheet provides a hierarchical representation of the human resources and organizations the enterprise currently employs. This information is used in one embodiment of the method and system of the present disclosure to understand where the enterprise stands, and identify any shortfalls in terms of human resources and capital.

The Solutions worksheet provides a hierarchical representation of solutions that may address identified shortfalls in business process, IT, data, and human organization. The solution may be software, services and their combinations. A solution does not have to be complete when offered. Instead, it may be composed and designed on demand to address a specific shortfall that is identified.

In one embodiment each model includes data structured in a tree format or view. FIG. 3 shows an example of the value driver tree in the Model Template with metrics attributes such as value type (column I), value unit (column J), benchmark value (column L), median value (column K), as-is value (column M) and to-be value (column N). The as-is value is the current value of the particular metric of the current business, i.e., where the business stands. The to-be value is the target value of the metric the business wants to achieve by applying one or more solutions, i.e., where the business wants to go. The benchmark and median values are reference values. For instance, the benchmark value may be a standard value for instance in the similar industry, and median value may be a median of all standard values, or like. They are compared with the as-is and target values to understand where the business stands and where the business wants to go in the group of peer enterprises. For example, if the as-is value is worse than the benchmark value, i.e., the best practice value among peer companies, the decision makers will want to improve it to the benchmark value level. That is, the to-be value will be the benchmark value. In one embodiment, the model content is generically in a tree form. As long as the structure is maintained, the user can add, delete and modify instances in the tree. In one aspect, a model worksheet may be named after the model that will be in it.

Model Mapping

In one embodiment of the BT tool of the present disclosure, models are mapped to each other. This linking enables the capability to answer various queries. This linking of models and the ability to query them are also referred to herein as "Daisy-Chain analysis." With binary mapping of models, the system infers correlations across multiple models, which provides qualitative understanding on how models are related. For example, with the daisy-chain analysis, the user can see all the business processes and activities that are associated with a business component. In turn, the user can see all the metrics (along with their values) and value drivers of the selected business processes, and so the user can qualitatively see the overall performance of the component.

Figure 4:
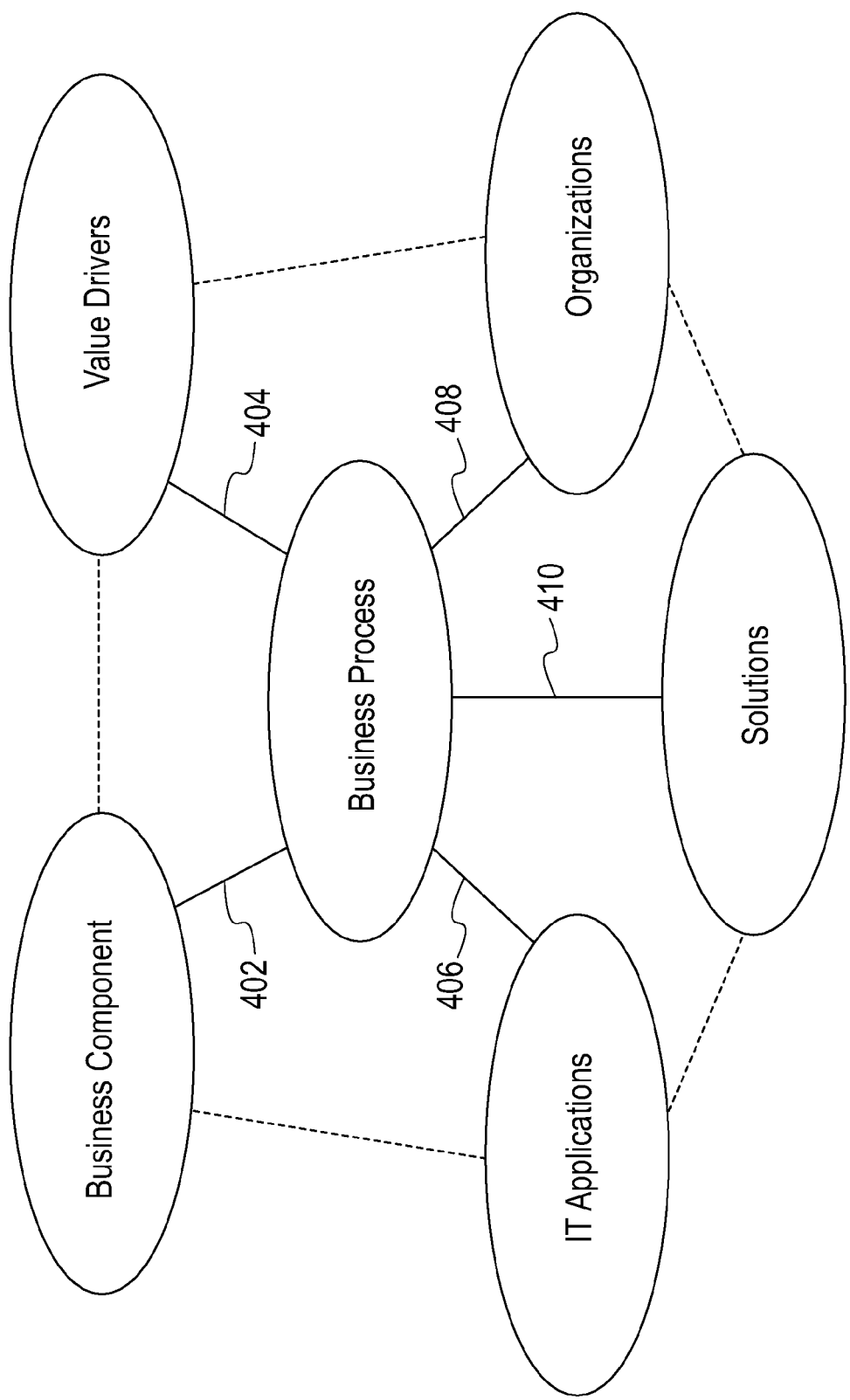
FIG. 4 illustrates a daisy chain model in one embodiment of the present disclosure.

FIG. 4 illustrates daisy chain of models in one embodiment of the present disclosure. For the six base models, the user may provide initial model mapping to Business Processes in the Model Template file, e.g., five types of links, i.e., Comp2BizProc 402, VD2BizProc 404, App2BizProc 406, Org2BizProc 408, and Sol2BizProc 410. In one embodiment, the BT tool uses a hub-and-spoke approach to linking of models, i.e., all models are linked to the business process model instead of each model linking to each other model as shown in FIG. 4. Each model mapping is stored in a separate mapping worksheet bearing the mapping name. The Model Template file provides a set of sample model mapping in the mapping worksheets. For instance, each mapping type has a worksheet. The mapping may be done manually by subject matter experts or business consultants. The mapping is used for the daisy-chain analyses. The explicit mappings stored in the mapping worksheets are used to infer implicit relationships among models in the daisy-chain analyses. The user can add, delete, modify instances in the mapping worksheets by changing entries in the source cell and target cell columns. If the user does not want to create model mapping information at this stage, the user may remove the provided sample data in the mapping worksheets (or worksheets themselves). This model mapping information in this file is optional, and not required to run the tool for analyses.

Figure 5:
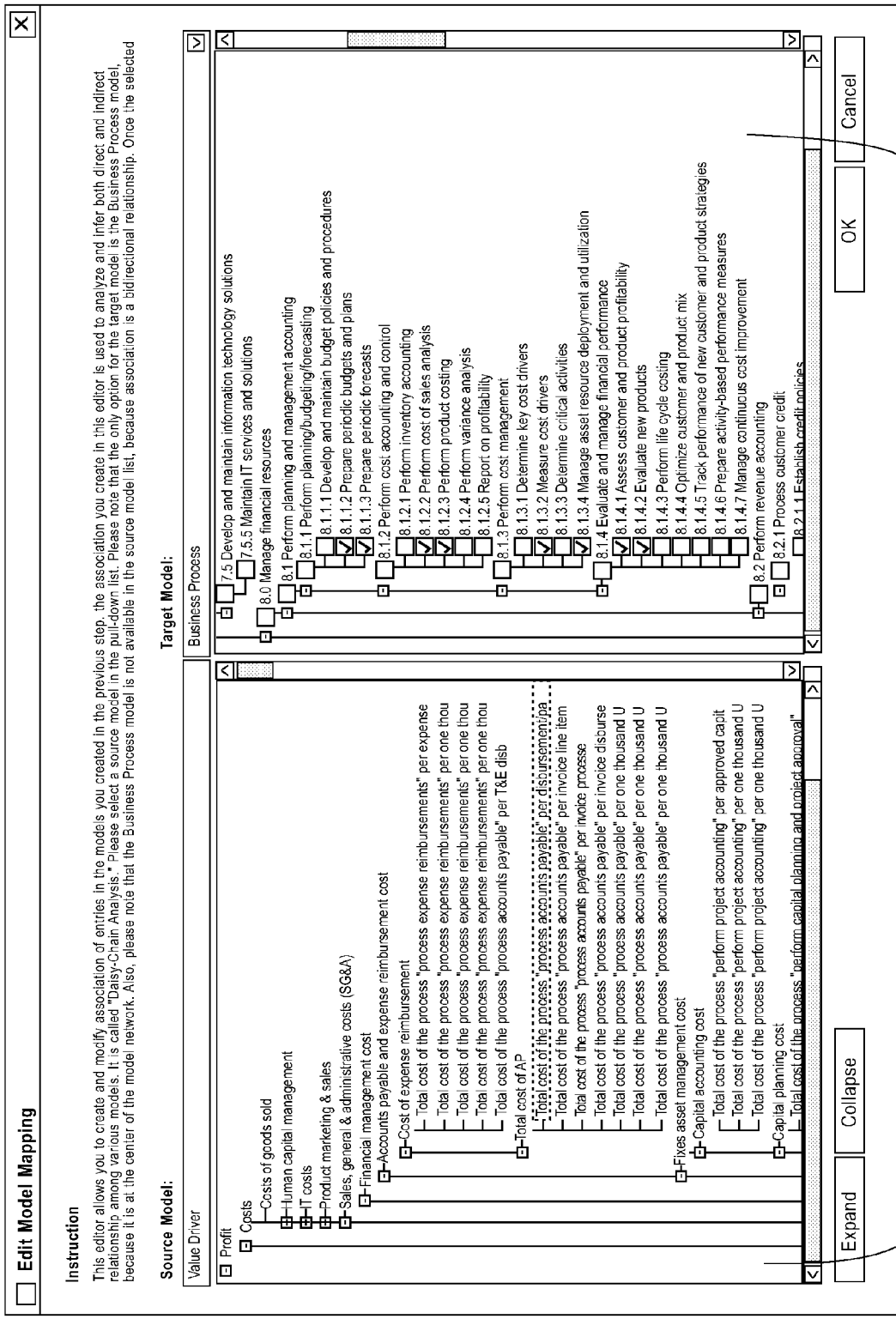
FIG. 5 shows a model mapping editor in one embodiment of the present disclosure.

The BT tool additionally may provide a user interface, e.g., Model Mapping Editor, for creating model mappings. Additional model mapping created with the editor may also be added to the Model Template file, when saved in BT tool. FIG. 5 shows the graphical user interface (GUI) editor for model mapping. It allows the user to select a source model and a target model. On the source side mappings are to be made from the leaf nodes, i.e., nodes with no child nodes. All other nodes of the tree are grayed out. The target model in one embodiment is always the business process model. The model mapping editor also provides tree views of the selected source and target models. In the tree view, the user can map entries in the source and the target models by using check-boxes and buttons. The editor may be implemented using programs such as Visual Basic™ or other programming languages.

The BT tool of the present disclosure in one embodiment allows mappings to be made to all levels of the business process tree. FIG. 5 at 502 shows an example of a business process. For example, "8.0 Manage Financial Resources" is a business process. It includes multiple subgroups, i.e., 8.1, 8.2, . . . , and multiple levels, i.e., 8.0=>8.1=>8.1.1=>8.1.1.1, as shown in the window 502. Mappings are allowed to be made at all levels of the business process tree mainly to deal with mappings between metrics and business processes. For instance, in FIG. 5, a metric in Value Driver tree 504, e.g., "Total cost of account payable process" can be mapped to a business process at any level of the Business Process tree 502, e.g., 8.0, 8.1, 8.1.1, or 8.1.1.1. Metrics as used herein refer to quantitative measures that indicate the performance of the business process. There may be metrics for all levels of business process. For example, benchmarking wizard tools may have measures and metrics at process level, at process group level. There may be metrics even at the process category level. The Model Mapping Editor allows the user to capture such mappings. In one embodiment, the BT tool does not allow for the same kind of possibility from the source side because opening up the entire tree on both sides could create possibilities for redundant mappings and sometimes even conflicting mappings. To avoid any confusion and redundancy in mappings, the source side opens for mapping only at the leaf node level whereas on the target side mappings are allowed to be made at all levels.

All the mappings in one embodiment of the present disclosure are bi-directional, meaning A is mapped to B, and then B is mapped to A automatically. In order to avoid duplication in mapping, the target model may be fixed to Processes. Every model (source) may be mapped to Process (target). However, Process is not mapped to any model manually. Instead, that part is implied by the first mapping. The mapping or associations made to children get propagated up to the parent but not vice versa in one embodiment. If a component is mapped to a process, it is not assumed that the component implements all activities in that process. For this reason, the BT tool in one embodiment does not propagate process level mappings down to activities.

The prepared content in the Model Template file, for instance, a spreadsheet file such as an Excel™ file is parsed and validated by the BT tool. If the content does not follow the required format set by the rules, a functional module in the BT Workbench such as data validating program, generates error messages to help the user repair the format of content.

Transformation Analyzer

The Transformation Analyzer component of the BT tool in one embodiment provides the following analysis capabilities, although the Transformation Analyzer's functionalities need not be limited to only those listed here: Daisy-Chain Analysis; Business Component Performance Analysis (also referred to as Heat Map Analysis); Shortfall Assessment for both IT application and organization; Solution Analysis; Business Report Generation, for instance, in MS Excel™ and PowerPoint™.

Component Business Modeling described above is a novel business modeling technique from IBM™, which enables users to understand and transform businesses. A component business model represents the entire business in a simple framework that fits on a single page. It is an evolution of traditional views of a business, such as ones through business units, functions, geography, processes or workflow. The component business model methodology helps identify basic building blocks of business, where each building block includes the people, processes and technology needed by this component to act as a standalone entity and deliver value to the organization.

After a comprehensive analysis of the composition of each business, a user can map these individual building blocks, or components, onto a single page of a user interface screen, for example as shown at 226 in FIG. 2. Each component business map may be unique to each company. The columns are created after an analysis of a business's functions and value chain. The rows are defined by actions. FIG. 2 at 202 shows an example of a Component Business Model map rendered in the BT tool. The top row, "direct," 204 shows all of those components in the business that set the overall strategy and direction for the organization. The middle row, "control," 206 represents all of the components in the enterprise, which translate those plans into actions, in addition to managing the day-to-day running of those activities. The bottom row, "execute," 208 contains the business components that actually execute the detailed activities and plans of an organization. The component business map shows activities across lines of business, without the constrictions of geographies, internal silos or business units.

This single page perspective 226 provides a view of the business, which is not constricted by barriers that could potentially hamper the ability to make meaningful business transformation. The component business model facilitates to identify which components of the business create differentiation and value. It also helps identify where the business has capability gaps that need to be addressed, as well as opportunities to improve efficiency and lower costs across the entire enterprise.

The "Daisy-Chain Analysis" is a visual query that allows the user to explore the business maps and understand the correlations and dependencies among business entities. The results of the query are shown in the views 210 of the models in the BT tool highlighting entries in the models that are associated directly and indirectly. For example, this capability can interactively identify one or more business components associated with a particular value driver. Conversely, it can find one or more value drivers that are affected by the performance of a particular business component. The associations between value drivers and business components are discovered through their relationships with business processes and activities set by using the Model Mapping Editor. Similarly, BT tool can identify and show dependencies between business activities and IT applications, and also between business activities and solutions and initiatives, both IT and business-driven.

Figure 7:
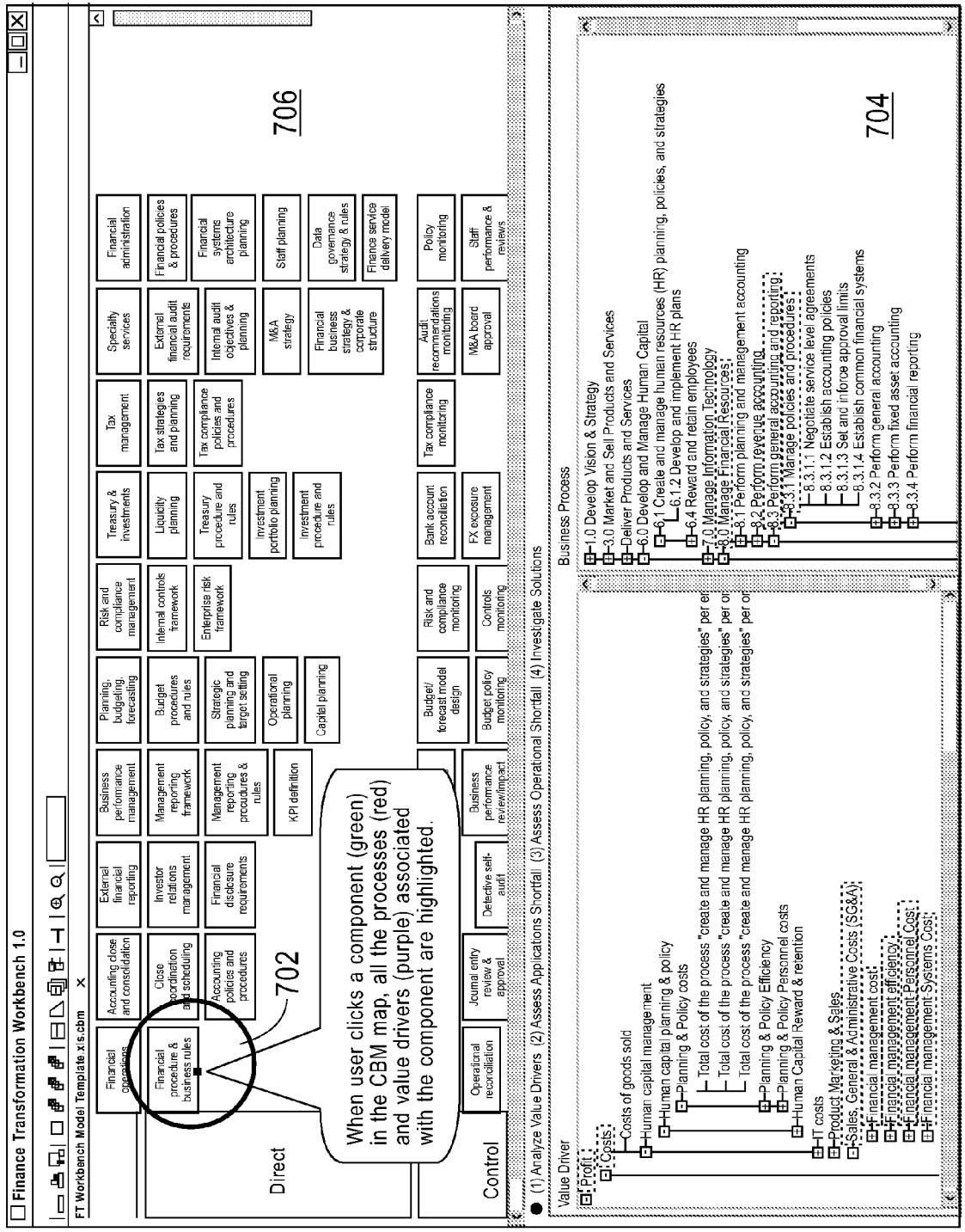
FIG. 7 illustrates a graphical user interface that enables daisy chain analysis in one embodiment of the present disclosure.

The relationships are transitive, and so it is possible to infer indirect associations between value drivers and IT applications/solutions, also between components and IT applications/solutions, and so on, through their direct linkages with entries in the business process model. Also, transitivity is used in inferring indirect relationship to ancestor entries when there is a direct relationship set for a child in a tree structured model. FIG. 7 shows an example of a user interface that includes a business component model 706 built from a template and Daisy-Chain Analysis 704 when a business component, "Financial Procedures & Business Rules" is selected, for example, by clicking on the box 702. The BT tool highlights all the business processes directly linked to the component, and also highlights all the metrics and value drivers indirectly linked to the component through those highlighted business processes. The user can see attribute values such as the as-is value and benchmark value by a mouse-over operation. To support the Daisy-Chain Analysis, the BT tool captures the basic relationship information in the Model Template file and also linkages set up with Model Mapping Editor.

The Business Component Performance Analysis allows the user to discover one or more "hot" components that are associated with one or more business strategies and/or pain points. A pain point is an area where a company is noted to be underperforming in comparison to its peers or industry leaders or expectations set by the company or combinations thereof. In the traditional CBM analysis, this step was conducted manually by the business consultants relying on knowledge and expertise in the business domain. The BT tool of the present disclosure automates the capability as visual queries, by taking metrics values into account with the analysis. The BT tool allows the user to explore the value driver tree. The Value Driver tree is a hierarchical representation of Key Performance Indicators (KPI) of business processes. At the lowest level, it provides business metrics, which are used to measure the performance of low level business activities of the Business Process Hierarchy. The Value Driver tree may also include attribute values such as one or more benchmark values and the business' current value associated with those metrics. The low level metrics are grouped to one or more higher level indicators. At the highest level of the Value Driver tree, the indicators are grouped into financial metrics of enterprises such as cost, revenue, profit, share value, etc.

Using the value driver tree, one or more value drivers can be identified that may be associated with a certain business strategy/pain point. The discovery of "hot" components that affect the business strategy can be accomplished. Various visualization techniques may be employed, for example, coloring the identified hot components differently to distinguish ones that affect positively or negatively to the strategy. The BT tool system compares the industry benchmark and the as-is value of the operational metrics and performance indicators associated with the components to decide on their color. FIG. 8 shows an example of a CBM map showing the result of a Business Component Performance Analysis.

An algorithm for coloring business component in the Business Component Performance Analysis is as follows: The BT tool system compares the three values—as-is (from client), benchmark, and median values of each metric associated with each business component. Benchmark and median values may be obtained from available benchmarking tools, benchmark data repositories, etc. For example, APQC provides sets of benchmark data for fee. Benchmark data may be also obtained from tools that survey and collect metrics value of a plurality of business processes from a plurality of members and/or customers. The data is then analyzed statistically. For example, the benchmark value of a metric is the 90 percentile value. The median value is the 60 percentile value, etc. If necessary, there can be more than one value like benchmark and median for comparisons. The business component is colored green, if the as-is value of each and every metric associated with this component is better than the corresponding benchmark value. The business component is colored yellow, if it has at least one metric whose as-is value is better the median value but worse then the benchmark value, and all the other metrics have as-is value, which is better than the benchmark value. The business component is colored red, if it has at least one metric whose as-is value is worse then the median value. The notion of "being better" compares differently for different metric value types: For the "Less is Better" type: A is better, if A<B. However, for the "More is Better" type: A is better, if A>B.

Depending on analysis needs, there may be many variants of the component color coding algorithms for the Business Component Performance Analysis. The following algorithms may be utilized:

AT LEAST ONE: The Business Component Performance Analysis engine identifies all the business components associated with the current value driver, and discovers ones at least one of whose associated metrics has the as-is value worse than the benchmark value; the engine colors the components red, while coloring the other components green. This algorithm is most aggressive in identifying "hot" components.

ALL: This algorithm is at the other end of the spectrum of Business Component Performance Analysis algorithms. It is most generous in identifying "hot" components. The Business Component Performance Analysis engine discovers business components all of whose associated metrics have the as-is value worse than the benchmark value; the engine colors the components red, while coloring the other components green.

MAJORITY without weights: This algorithm is in the middle of the spectrum. The Business Component Performance Analysis engine discovers business components more than half of whose associated metrics have the as-is value worse than the benchmark value; the engine colors the components red, while coloring the other components green.

MAJORITY with weights: This algorithm assumes some weight value assigned to each metric. Also, it assumes a threshold value that compared to a component's "heat" value. The heat value of a component is computed by applying the difference of as-is values and benchmark values of associated metrics and their weights. Depending on how the equation is formulated, this algorithm can provide various results. This can be a generic algorithm for the three special cases above.

A spectrum of colors may be used to indicate the results of the performance analysis. More colors can be added (in addition to red and green) to represent the "heat" degree ("temperature") of components. One example is the use of yellow in FIG. 8 to indicate the mediocre performance between red and green.

The system and method may color the identified hot components differently to distinguish those that affect positively or negatively to the strategy. For example, high performance components that positively affect the implementation of the business strategy of the company and low performance components that negatively affect the implementation of the business strategy of the company may be represented differently for easy visualization. Other visualization mechanisms may be employed. The system and method in one embodiment may compare the industry benchmark and the as-is value of the operational metrics and performance indicators associated with the components to decide on their color. FIG. 8 shows an example of a CBM map showing the result of a Business Component Performance Analysis.

An algorithm for coloring business component in the Business Component Performance Analysis is as follows: The system and method of the present disclosure may compare the three values—as-is (from client), benchmark, and median values of each metric associated with each business component. Benchmark and median values may be obtained from available benchmarking tools, benchmark data repositories, etc. For example, American Product Quality Council (APQC) provides sets of benchmark data for fee. Benchmark data may be also obtained from tools that survey and collect metrics value of a plurality of business processes from a plurality of members and/or customers. The data is then analyzed statistically. For example, consider an example where the benchmark value of a metric is the 90 percentile value; the median value is the 60 percentile value, etc. More than one values of benchmark and median values may be used in the comparisons. As an example of visualization, the business component is colored green, if the as-is value of each and every metric associated with this component is better than the corresponding benchmark value. The business component is colored yellow, if it has at least one metric whose as-is value is better the median value but worse then the benchmark value, and all the other metrics have as-is value, which is better than the benchmark value. The business component is colored red, if it has at least one metric whose as-is value is worse then the median value. The notion of "being better" compares differently for different metric value types: For the "Less is Better" type: A is better, if A<B. However, for the "More is Better" type: A is better, if A>B.

Figure 1:
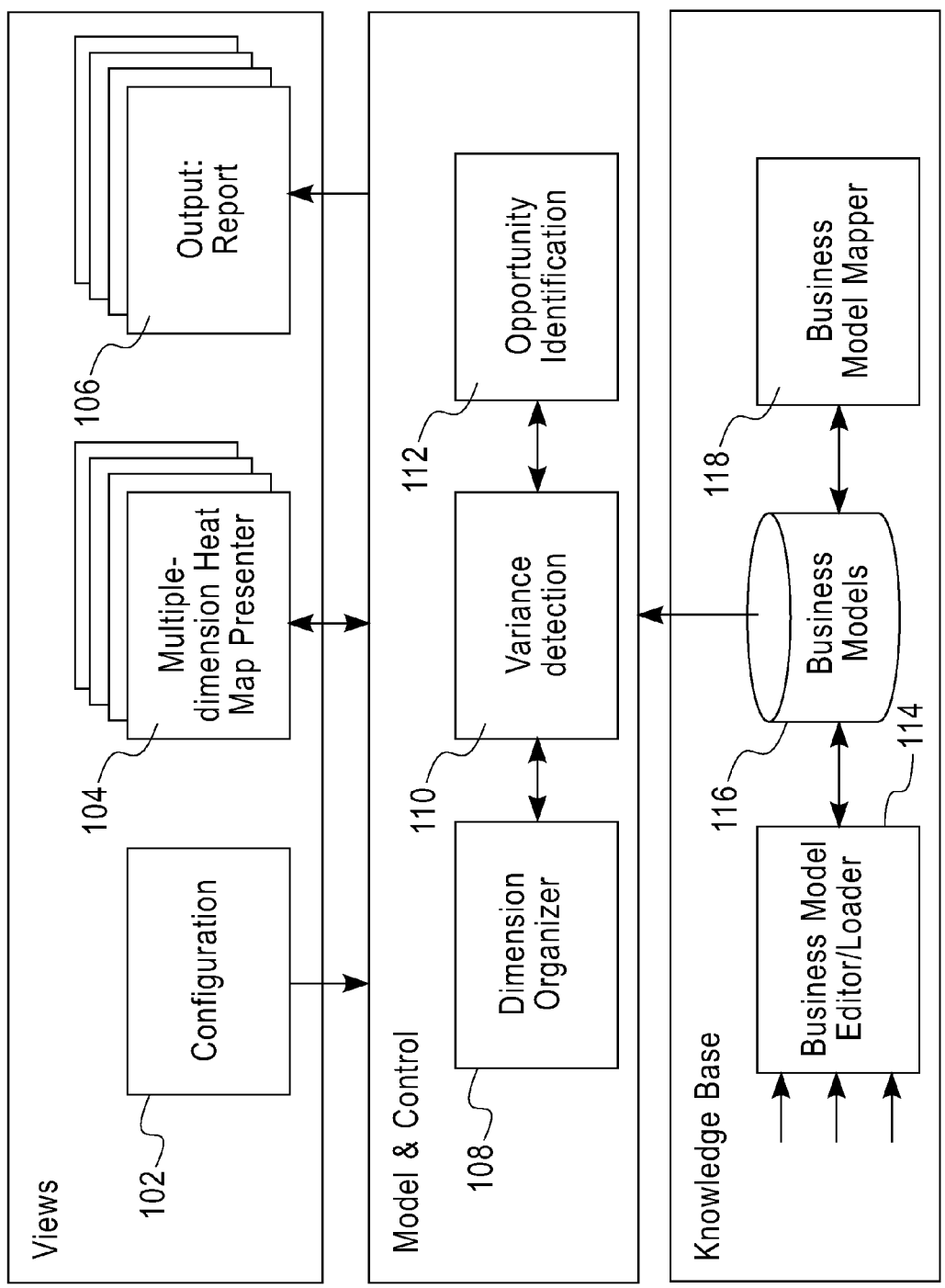
FIG. 1 is an architectural diagram illustrating functional components for identifying business opportunity through multiple-dimension heat map analysis.

FIG. 1 is an architectural diagram illustrating functional components for identifying business opportunity through multiple-dimension heat map analysis. Configuration 102 enables users to configure the dimensions to be included in the analysis. Multiple-dimension heat map presenter 104 provides multiple views of heat map and the changes that may have occurred. The analysis result can be generated, for example as reports 106. Dimension organizer 108 transforms a component map and related business model according to the dimensions provided in configuration 102. For instance, dimension organizer module 108 may extract related data from knowledge base 116, for example, heat map data associated with the selected dimensions. For example, via the configuration module 102, a user may set the dimension as time, and the unit as year, and the duration as three years. The Dimension organizer 108 queries the knowledge base 116 to prepare annual data that is related to the heat map in the past three years. Dimension organizer 108 calculates the heat map for each year. Each component in the component map may thus have three annual evaluation results.

Variance detection component 110 may include a matching engine to detect the variance or differences among different maps. Referring to the above described time-dimension scenario as an example, variance detection component 110 analyzes the changes of each business component over the three years. Based on the detected variations, opportunity identification module or component 112 provides a set of algorithms to calculate the shortfall and identify transformation opportunity to form project portfolio. Continuing with the previous example, opportunity identification component or module 112 uses a "find out stepping-down" algorithm to find out which component's competency is continually dropping. For instance, if "Human Resource Management" component competency has been continually dropping in the past three years according to the variance detection component 110, "Human Resource Management" can be identified as a transformation opportunity (e.g., outsource, or have an initiative to improve the human resource management competency). Business models 116 store different business aspects, which have correlations, such as business component, business process, application, solution, organization, etc. User can edit or load the business models through business model editor 114, and map the correlation among these business models through business model mapper 118.

Figure 9B:
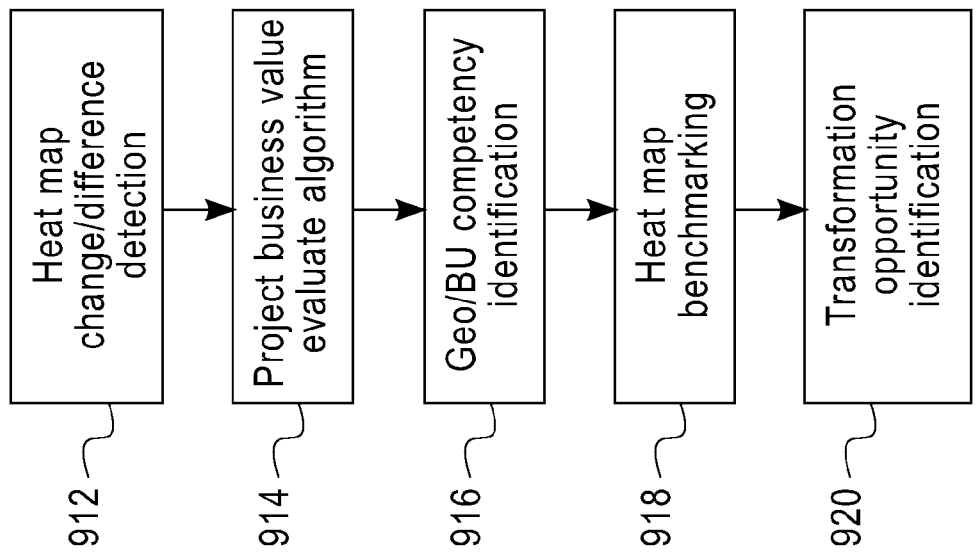
FIG. 9B illustrates an algorithm that may be used to perform heat map evaluation analysis in one embodiment of the present disclosure.
Figure 9A:
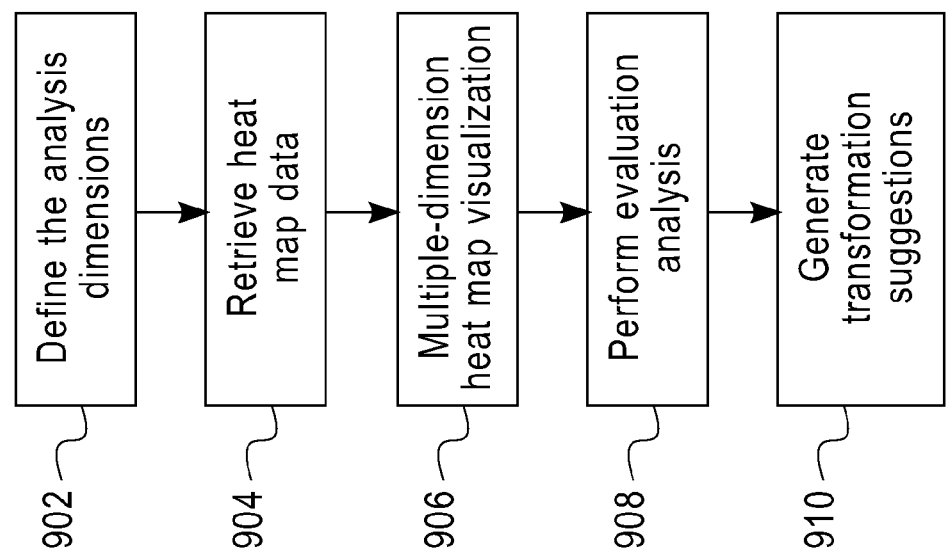
FIG. 9A illustrates steps performed in one embodiment of the present disclosure, for example, by modules shown in FIG. 1.

FIG. 9A illustrates steps performed in one embodiment by modules shown in FIG. 1. At 902, analysis dimensions are defined. Dimensions, for instance, may be defined via the configuration module 102 shown in FIG. 1, which for example may define how many and what dimensions are to be included in the analysis. In one embodiment, a user interface module may interact with the configuration module to receive inputs from users as to which and what dimensions are to be defined. Based on the defined or determined scope of the dimensions, a dimension organizer module (e.g., FIG. 1, 108) may extract related data from knowledge base (e.g., FIG. 1, 116), that is, heat map data associated with the selected dimensions, as shown at step 904. At step 906, the multiple-dimension information is presented, for instance, by multiple-dimension heat map presenter module (e.g., FIG. 1, 104) in one or more visualization forms. At step 908, evaluation analysis may be performed and one or more variances are identified. Examples of the algorithms that may be used to perform the evaluation analysis are shown in FIG. 9B. Based on the analysis, one or more transformation suggestions are generated and shown in heat map at step 910.

FIG. 9B illustrates an algorithm that may be used to perform heat map evaluation analysis in one embodiment of the present disclosure. At 912, heat map change and/or difference detection may be performed. This step, for instance, may include comparing the heat evaluation result for each component in two or more selected heat maps. At 914, project business value and evaluate algorithm may be performed. For instance, for each component, an algorithm may generate the analysis time periods with consistency project combinations, based on the start and end time of projects. That is, if there is overlay over time between multiple projects, the overlap period should be segmented based on the project combination, considering reasonable time delay if needed. Also for each component, the algorithm may detect changes over different period; translate the changes to linear equation set, e.g., according to length of period; if the equation is not singular, the algorithm obtains the result as project unit contribution and extends to the whole project period; if the equation is singular, attributed percentage may be input manually. If all the projects happen in the same period, the variance alone is sufficient to contribute to the changes to each project. The step of projecting business value evaluation may also include aggregating the value of each component as the business value of a project. For example, an ERP upgrading project is implemented at the end of first year, in the second year and third year, the competency of three components, e.g., including "order management", "production planning & execution", and "after-sale service" are all improved. The value of ERP upgrading project is aggregated by the value to these three components. This example assumes there is a single project. If there are multiple projects that overlap in the same three-year period, the improvements to each project contribute to the computation. The value of a project is still the aggregate of the values of its multiple components.

At 916, Geographic and/or business unit (BU) competency identification may be performed. In the heat map of the evaluated Geographic and/or BU, this algorithm may mark the component that is higher than the other evaluated objects. These components may be regarded as differentiated competency of the evaluated Geographic and/or BU. This algorithm may also mark the component that is the best but not the only one as the overlapped core competencies. According to physical distance and risk consideration, one or more consolidation decisions can be made. For example, an international company has many manufacturing factories and research and development (R&D) teams distributed over several countries. But in the NA (North American) countries, "production execution" competency is LOW while "New Product Design & Development" is HIGH. In contrast, in AP countries (Asia Pacific), "production execution" competency is HIGH while "New Product Design & Development" is MEDIUM. From efficiency perspective, the company may close NA's manufacturing factories and consolidate them with that of in AP countries, consolidate all AP's development teams with that of in Australia (considering the distance between manufacturing factories with development), and keep NA's development team as-is.

At 918, heat map benchmarking may be performed, for instance, by comparing with peer or industry best practice heat map. At 920, transformation opportunity identification may be performed. Heat component metrics may be linked with enterprise-wide metrics, and the relationship between heat component metrics with enterprise-wide metrics may be set-up. Sensitivity analysis of current non-core components may be performed and the opportunities may be prioritized. For example, consider "Order Management" component that has two metrics: order processing time, and fulfillment percentage. 10% reduction in order processing time can improve 2% of sales revenue (an enterprise-wide metrics), and 10% improvement in fulfillment percentage can improve sale revenue 5%. An ERP Sale & Distribution module implemented initiative can reduce 20% of order processing time and improve 3% of fulfillment percentage. Thus the value of ERP Sale & Distribution module implemented initiative is 4.5% of sales revenue. Other initiatives can be evaluated by such sensitivity analysis. Thus these initiatives can be prioritized according to their value.

Figure 10A:
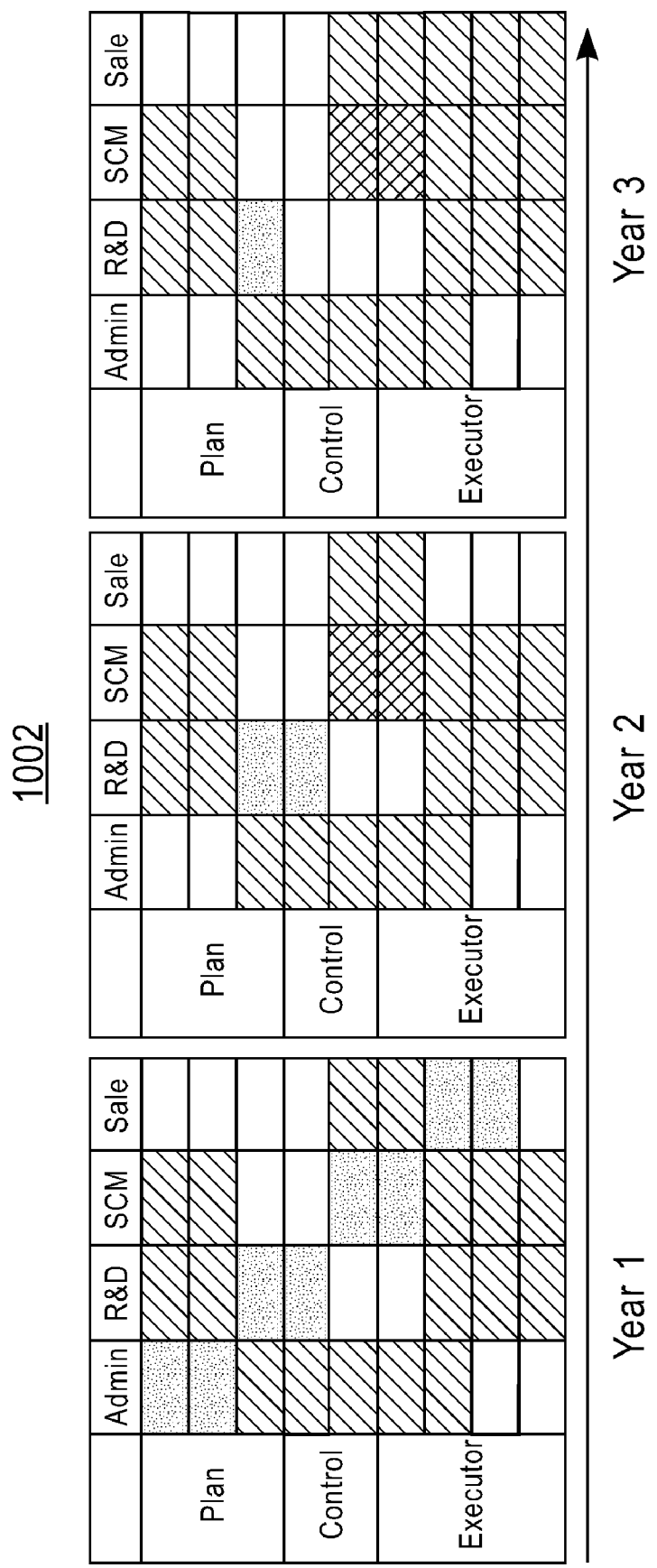
Figure 10C:
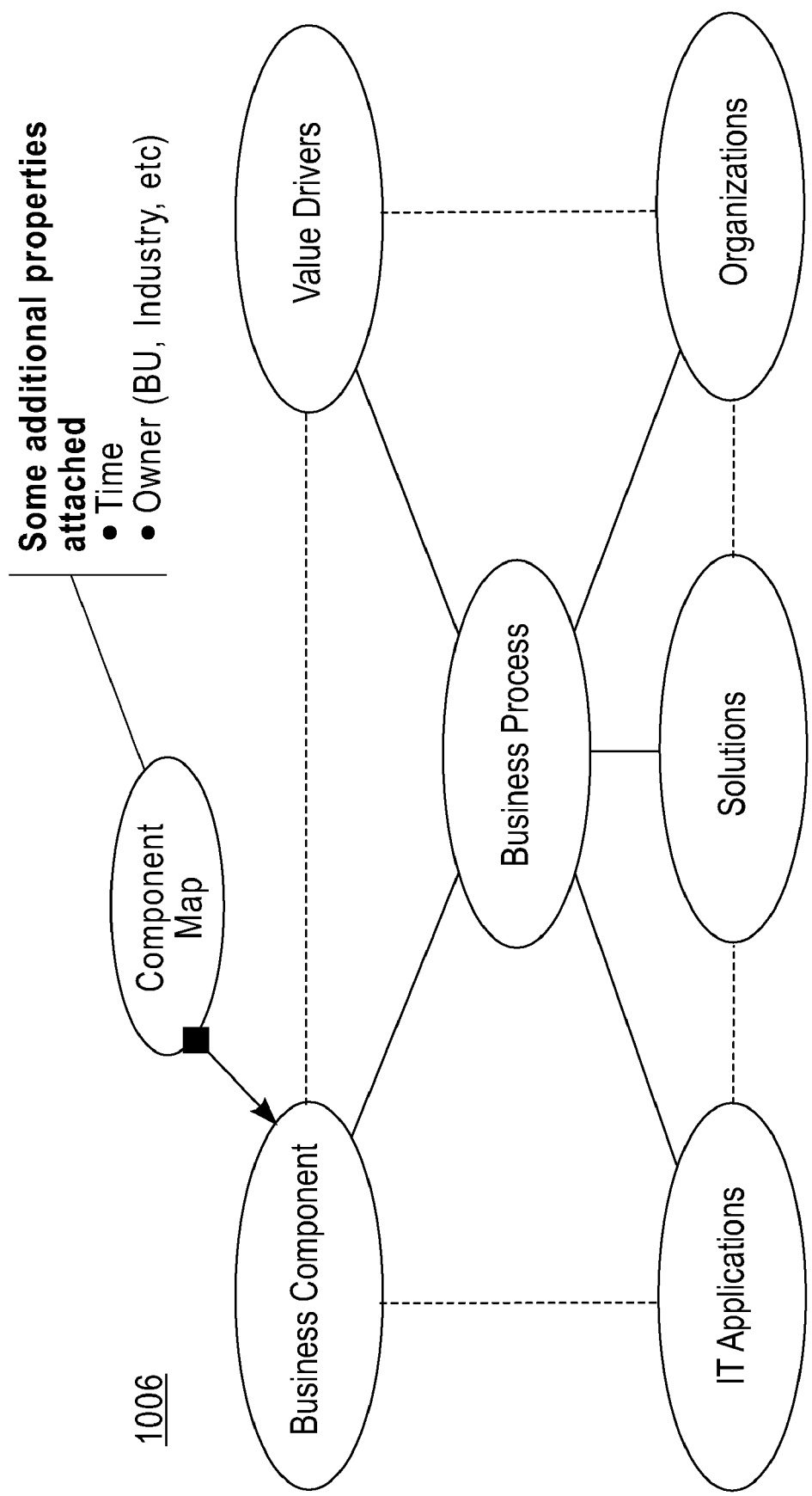

FIGS. 10A, 10B, and 10C illustrate two examples of evaluation analysis and determining one or more variances and/or differences explained in step 908 of FIG. 9A. The heat map at 1002 is presented with time dimension, considering the heat map for three year time period. Through the series of heat maps over the years (Year 1, Year 2, Year 3), the changes of each business component can be obtained. A model 1006 in FIG. 10C may be used to determine how the changes are linked with past initiatives or projects. Thus business values of these projects can be evaluated. The maps illustrate how the enterprise performed over the years and can help define next focus on the business or objective. FIG. 10B at 1004 illustrates heat maps of an enterprise over two different geographic locations (e.g., North America and Asia Pacific).

Figure 11:
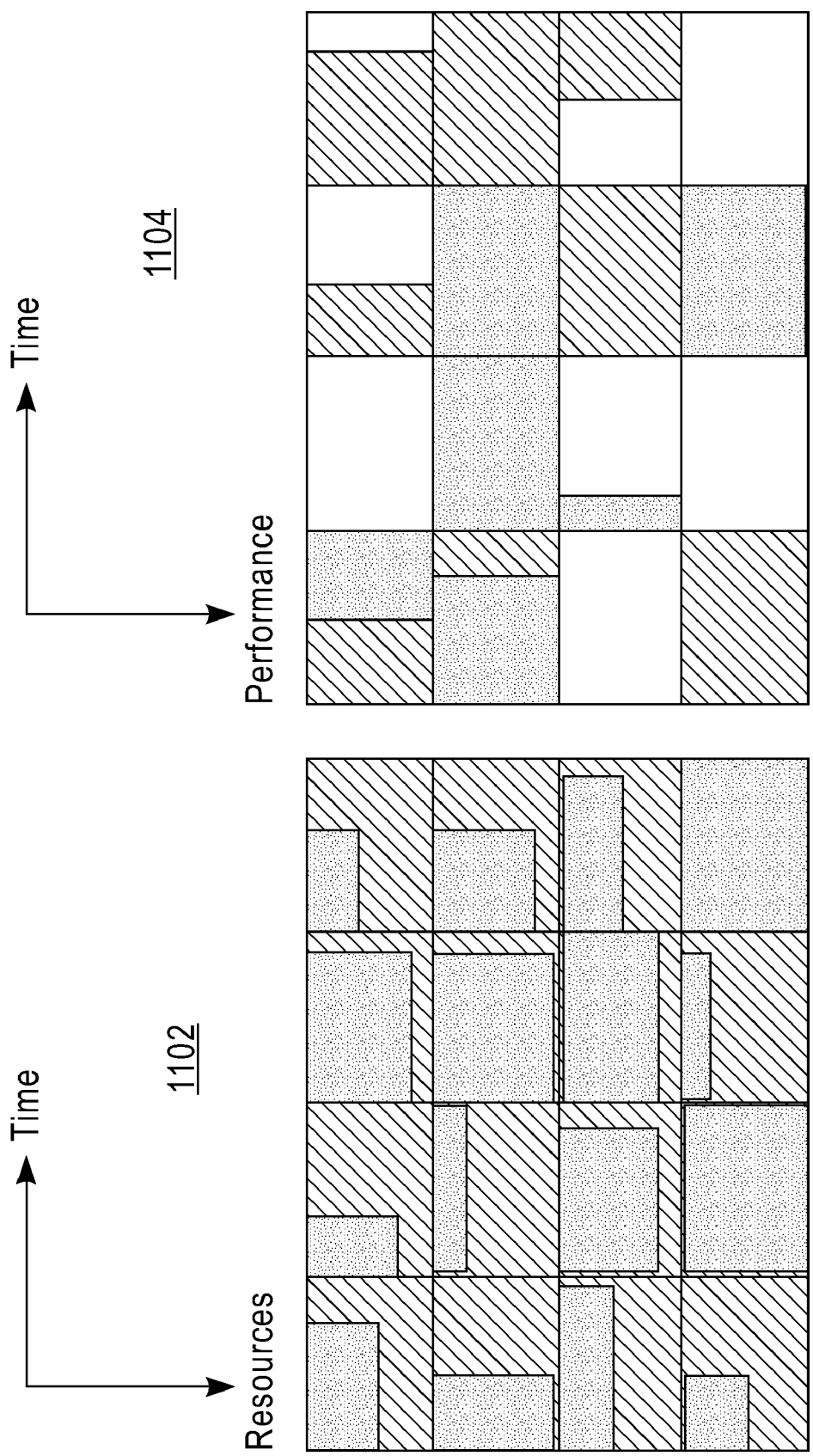
FIG. 11 provides two examples of multiple-dimension heat map presenter.

FIG. 11 provides two examples of output from a multiple-dimension heat map presenter (e.g., FIG. 1, 104). The example heap map 1102 presents the heat of a business component from time and resource dimension. The color scheme indicates the different state of the component at given dimension composition. The rows show how the heat changes over time. The columns show the heat of a component evaluated from different resource perspective. The heat map 1104 is another example showing time and performance dimensions. There are usually more than one performance metrics to measure whether a component is hot. Instead of merging them into one comprehensive metrics, the multiple-dimension presenter can also show the heat of business component from different performance metrics perspective.

An enterprise may use the system and method of the present disclosure to evaluate multiple-period business transformation. For instance, the enterprise may utilize the system and method of the present disclosure to trace the transformation path, determine competency changes trend, detect the deviation of the real changes (as-is map at that period) from the designed goal (to-be map at each period), evaluate the business value of past projects, map the project to components and period, evaluate the outcome of each project, identify future opportunities and transformation roadmap. A global enterprise with many branches may evaluate the competency of branch companies over different geographical locations, use the maps as a pilot display for executive people, decide the competency allocation, distribution, and/or consolidation, and produce transformation roadmap for each geographic location. Multidimensional heat maps of the present disclosure may be also used for industry benchmarking, for instance, by comparing an industry's own heat map with peer heat map or industry best practice industry map.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for analyzing business performance and opportunities by generating one or more series of heat map views of business components by a plurality of dimensions, comprising:
    associating information related to a plurality of dimensions with one or more business components;
    defining, by a processor, one or more dimensions from the plurality of dimensions, defining including at least selecting one or more dimensions from the plurality of dimensions, said plurality of dimensions including at least a time dimension, as-is and to-be dimension, and directional change for better or worse dimension;
    generating one or more series of heat map views of the said business components by said defined one of more dimensions,
    wherein a heat map view by time dimension if selected shows a heat map per interval over a selected period, a heat map view by as-is and to-be dimension if selected shows enterprise strategy and current status, a heat map view by directional change for better or worse dimension if selected shows whether a business is becoming better, worse, or staying the same; and
    presenting said series of heat map views of the business components by said selected one or more dimensions.

2. The method of claim 1, further including:
    discovering one or more heat maps similar to or different from said one or more series of heat maps.

3. The method of claim 1, wherein the step of defining further includes allowing a user to select one or more dimensions, and configuring said one or more dimensions selected by the user.

4. The method of claim 1, further including identifying one or more transformation opportunities utilizing said series of heat map views of the business components.

5. The method of claim 1, further including detecting heat map changes utilizing said series of heat map views of the business components.

6. The method of claim 1, further including evaluating project business value utilizing said series of heat map views of the business components.

7. The method of claim 1, further including identifying geographical competency utilizing said series of heat map views of the business components.

8. The method of claim 1, further including benchmarking industry values utilizing said series of heat map views of the business components.

9. The method of claim 1, further including:
   determining one or more variances associated with the information related to said one or more dimensions of said one or more business components.

10. The method of claim 9, further including:
    identifying one or more transformations to said one or more business components based on said one or more variances.

11. The method of claim 1, wherein the step of presenting includes providing visualization to distinguish positively and negatively affected business components by said one or more dimensions.

12. The method of claim 1, wherein said one or more dimensions include one or more business metrics.

13. The method of claim 1, wherein the step of presenting includes presenting heat of said one or more business components by said one or more dimensions, the heat of said one or more business components representing a degree to which said one or more business components are underperforming compared to a selected performance level.

14. The method of claim 13, wherein the selected performance level includes a performance level of a peer in industry.

15. The method of claim 13, wherein the selected performance level includes an expectation goal set by an entity.

16. A system for analyzing business performance and opportunities by generating one or more series of heat map views of business components by a plurality of dimensions, comprising:
   a processor;
   a configuration module operable execute on the processor and to define a plurality of dimensions of one or more business components, said plurality of dimensions including at least a time dimension, as-is and to-be dimension, and directional change for better or worse dimension;
   a dimension organizer module operable to transform a business component map comprising said one or more business components into a view with said plurality of dimensions to generate one or more series of heat map views of the said business components by said plurality of dimensions, wherein a heat map view by time dimension if selected shows a heat map per interval over a selected period, a heat map view by as-is and to-be dimension if selected shows enterprise strategy and current status, a heat map view by directional change for better or worse dimension if selected shows whether a business is becoming better, worse, or staying the same; and
   a multiple-dimension heat map presenter module operable to present said one or more series of heat map views in different dimensional perspective.

17. The system of claim 16, wherein the dimension organizer module extracts heat map data associated with said plurality of dimensions of said one or more business components to generate said one or more series of heat map views.

18. The system of claim 16, further including a variance detection module operable to determine variances of heat data of said one or more business components between said plurality of dimensions.

19. The system of claim 16, further including a opportunity identification module operable to determine one or more business transformation opportunities in said one or more business components based on said generated one or more series of heat map views.

20. The system of claim 16, wherein the multiple-dimension heat map presenter module is operable to provide visualization to distinguish positively and negatively affected business components by said plurality of dimensions.

21. The system of claim 16, wherein said plurality of dimensions includes business metrics.

22. The system of claim 16, wherein the multiple-dimension heat map presenter module is operable to present heat of said one or more business components by said plurality of dimensions, the heat of said one or more business components representing a degree to which said one or more business components are underperforming compared to a selected performance level.

23. The system of claim 22, wherein the selected performance level includes a performance level of a peer in industry.

24. The system of claim 22, wherein the selected performance level includes an expectation goal set by an entity.

25. The system of claim 16, further including a knowledge base module operable to store a plurality of business models associated with said one or more business components.

26. A program storage device readable by a machine, tangibly embodying a program of instructions executable by the machine to perform a method for analyzing business performance and opportunities by generating one or more series of heat map views of business components by a plurality of dimensions, comprising:
   associating information related to a plurality of dimensions with one or more business components;
   defining one or more dimensions from the plurality of dimensions, defining including at least selecting one or more dimensions from the plurality of dimensions, said plurality of dimensions including at least a time dimension, as-is and to-be dimension, and directional change for better or worse dimension;
   generating one or more series of heat map views of the said business components by said defined one of more dimensions, wherein a heat map view by time dimension if selected shows a heat map per interval over a selected period, a heat map view by as-is and to-be dimension if selected shows enterprise strategy and current status, a heat map view by directional change for better or worse dimension if selected shows whether a business is becoming better, worse, or staying the same; and
   presenting said series of heat map views of the business components by said selected one or more dimensions.

27. The program storage device of claim 26, further including:
   discovering one or more heat maps similar to or different from said one or more series of heat maps.

28. The program storage device of claim 26, wherein the step of defining further includes allowing a user to select one or more dimensions, and configuring said one or more dimensions selected by the user.

29. The program storage device of claim 26, further including identifying one or more transformation opportunities utilizing said series of heat map views of the business components.

30. The program storage device of claim 26, further including detecting heat map changes utilizing said series of heat map views of the business components.

31. The program storage device of claim 26, further including evaluating project business value utilizing said series of heat map views of the business components.

32. The program storage device of claim 26, further including identifying geographical competency utilizing said series of heat map views of the business components.

33. The program storage device of claim 26, further including benchmarking industry values utilizing said series of heat map views of the business components.

34. The program storage device of claim 26, further including:
determining one or more variances associated with the information related to said one or more dimensions of said one or more business components.

35. The program storage device of claim 34, further including:
identifying one or more transformations to said one or more business components based on said one or more variances.

* * * * *